Feb. 3, 1959  F. RAY  2,871,885
EXPANSION JOINTS AND PLATES THEREFOR
Filed Nov. 13, 1953  3 Sheets-Sheet 1

INVENTOR.
FREDERICK RAY
BY
ATTORNEYS

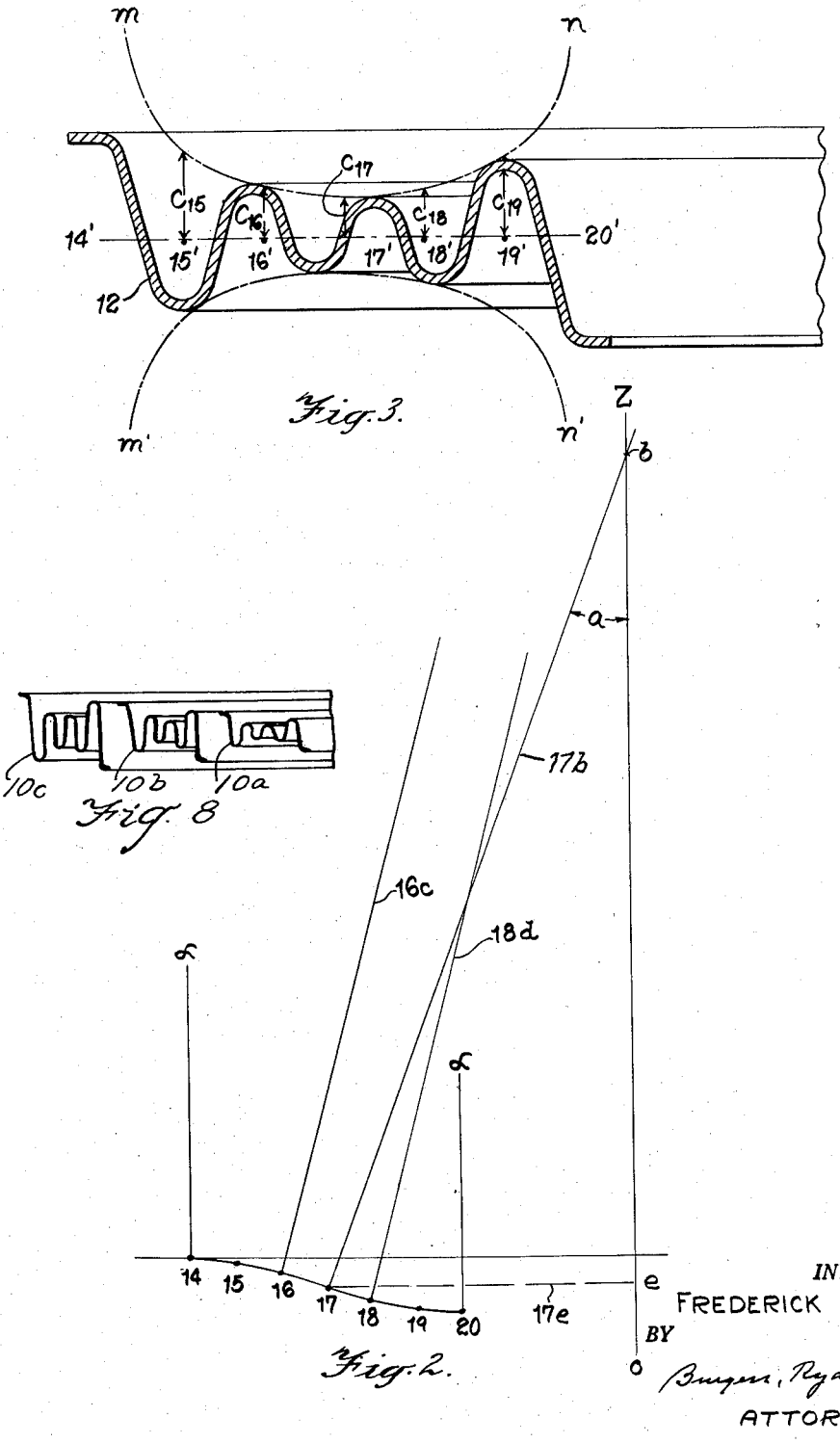

Feb. 3, 1959 F. RAY 2,871,885
EXPANSION JOINTS AND PLATES THEREFOR
Filed Nov. 13, 1953 3 Sheets-Sheet 3

INVENTOR.
FREDERICK RAY
BY
Burgess, Ryan & Hicks
ATTORNEYS

United States Patent Office 2,871,885
Patented Feb. 3, 1959

2,871,885
EXPANSION JOINTS AND PLATES THEREFOR
Frederick Ray, Montecito, Calif.
Application November 13, 1953, Serial No. 391,847
8 Claims. (Cl. 138—50)

The present invention relates to expansion joints for pipes and relates, more particularly, to the configuration of annular plates for use in expansion joints of the bellows type.

An object of the invention is to provide a plate for an expansion joint which is formed so that it is capable of greater deflection than previous plates of the same size and thickness under same stress limits and same internal pressure.

Another object of the invention is the provision of an expansion joint plate which is formed so that the maximum bending stresses in a transverse or tangential plane at points of maximum of such stresses are substantially equal or of other predetermined relative magnitude.

Another object of the invention is the provision of an expansion joint plate which is formed so that the maximum bending stress in a transverse or tangential plane at any point of maximum of such stress is of predetermined ratio to the maximum bending stress in a radial plane at any point of maximum of such stress.

Still another object of the invention is to provide maximum support for the internal pressure in an expansion joint by means of a concentric forming of the plates which at the same time decreases the radial bending stress due to the deflection of the plate resulting from the axial movement of the joint.

A further object of the invention is to increase the transverse or tangential stiffness of an expansion joint plate so as to increase the proportion carried thereby of the pressure load upon the plate and thus decrease the portion of that load supported by the plate in the radial plane, thereby permitting greater axial deflection of the plate when under pressure than would otherwise be possible within the stress limitations.

The invention resides further in the method of determining the controlling characteristics of the corrugations of a plate for an expansion joint in order that the above mentioned objects may be obtained.

Other objects and advantages of the invention will be best understood from the following description and the accompanying drawings in which:

Fig. 2 is a diagrammatic showing of a half section of the neutral surface of one of the plates illustrated in Fig. 1, but on an enlarged scale;

Fig. 3 is a fragmentary view in section of a portion of one of the corrugated plates illustrated in Fig. 1, but on an enlarged scale;

Fig. 8 is a fragmentary view diagrammatically illustrating the configuration of the corrugations in a series of three annular plates of different diameters embodying the invention.

Figure 1:
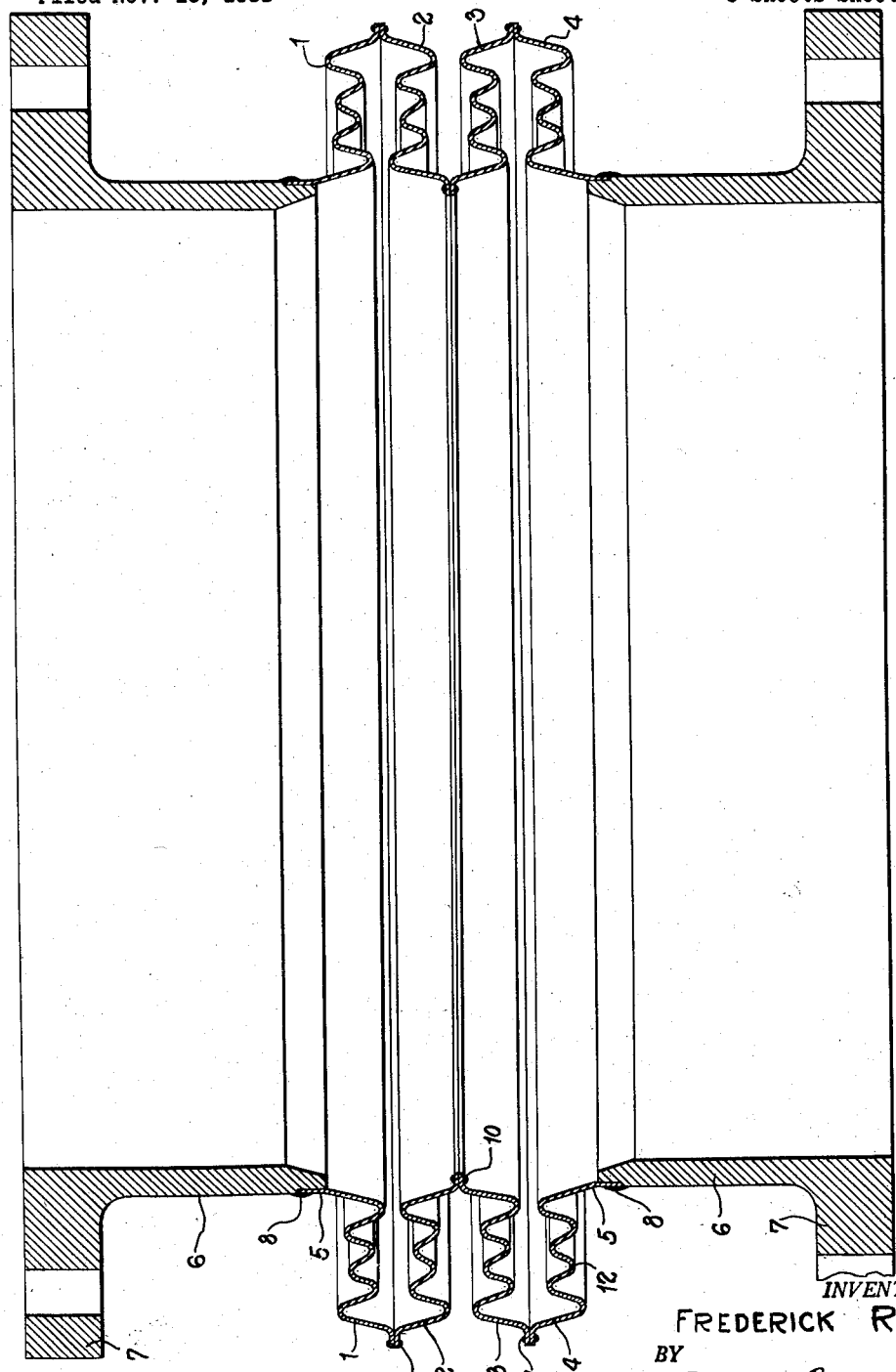
Fig. 1 is an axial section of a four plate expansion joint embodying the present invention.

Referring to Fig. 1, there is shown an expansion joint of the bellows type which is interposed between the opposing ends of two lengths of pipe (not shown) and permits relative movement of the ends of the pipes to compensate for the thermal or other expansion and contraction of the pipes.

The expansion joint illustrated consists of four annular plates 1, 2, 3 and 4 made of a relatively thin metal. The plates are usually circular; that is, the inner and outer peripheries of the plates are circles whose centers lie on the same axis which is normal to the planes of both peripheries. Flanges 5 are formed at the inner peripheries of the two end plates 1 and 4 to fit over the sides of nipples 6 formed on the end flanges 7. The flanges of the end plates are welded to the nipples 6, as indicated at 8, and the end flanges 7 are bolted to corresponding flanges (not shown) on the ends of pipes in a piping system.

When the plates are assembled, they are welded together alternately at their inner and outer edges. In other words, the plates 1 and 2 are welded together at their outer edges as indicated at 9; the plates 2 and 3 are welded together at their inner edges as indicated at 10; and the plates 3 and 4 are welded together at their outer edges, as indicated at 11. Any of the usual methods of welding, such as atomic hydrogen, may be used and the edges of the plates are preferably welded together without the use of filler rod. The welds 8 joining the end plates 1 and 4 to the pipe nipples 6 may be made with the use of filler rod or by means of metallic arcs using covered electrodes.

In the arrangement of the plates shown in Fig. 1, the inner flanges of the plates 2 and 3 which are welded together at 10, are reversed relative to each other which gives the advantage of the use of identical plates and permits the neutral surface of the plate, as indicated by the line 14—20 in Fig. 2, to be perpendicular to the axis of the plate when in undeflected position which is preferable to arrangements of plates which compel the neutral surface to be more or less conical, although it is possible with reduced efficiency to adapt a plate embodying the present invention to such arrangements. Guides for maintaining alignment of the joint and stops for limiting the movement are not shown as they are not always necessary and can easily be attached in various well known forms if desired.

In the embodiment of the invention illustrated in Fig. 1, four plates are used, but it will be understood that in practice the number of plates may be varied from a minmum of two up to any number that may be necessary to obtain the required relative movement of the flanges of the joint.

Such expansion joints commonly are subjected to the internal pressure within the piping system, which internal pressure sets up stresses in the plates in addition to the stresses set up by the expansion or contraction of the joint and these two sets of stresses are additive at either the inner or outer peripheries of the plates, that is, where the adjoining plates are welded together or immediately adjoining the weld to create a maximum radial bending stress at such point.

In use it is essential that the joint not only be capable of withstanding these stresses but that it also be capable of withstanding a certain number of cycles of movement which requirement in practice varies from a few hundred to many thousands.

Figure 4:
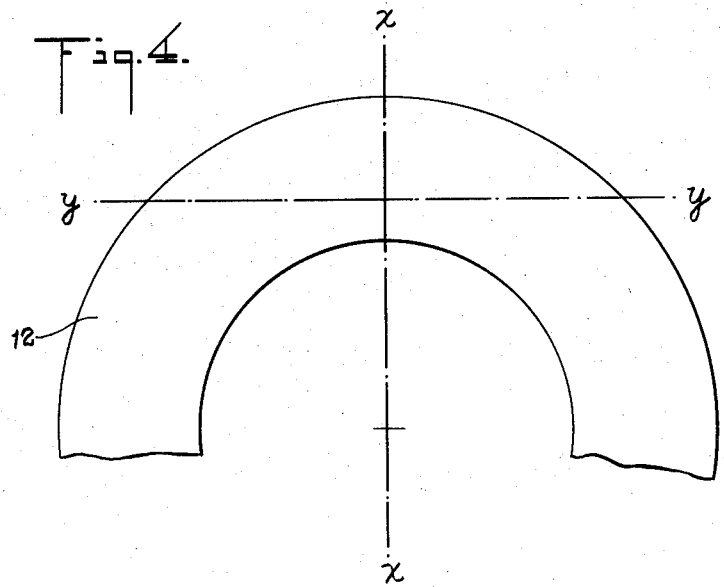
Fig. 4 is a plan view of a portion of a flat annular plate.
Figure 5:
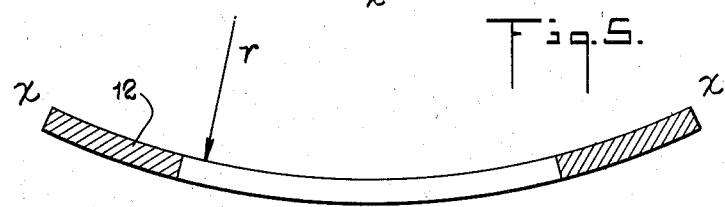
Fig. 5 is a diagrammatic illustration of the bending of the plate shown in Fig. 4 along the axis X—X thereof when the plate is supported along its outer periphery and is loaded along its inner periphery.
Figure 6:
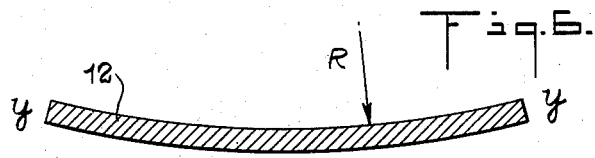
Fig. 6 is a diagrammatic illustration of the bending of the plate shown in Fig. 4 along the Y—Y axis thereof under the conditions specified for Fig. 5.

The expansion and contraction of the expansion joint results in axial deflection of the plates, that is, axial movement of the inner edge of the plate relative to the outer edge in one direction or the other. The axial deflection of a plate causes bending of the plate in a radial plane (illustrated by the line X—X of Fig. 4) and also in a tangential or transverse plane (illustrated by the line Y—Y of Fig. 4). The bending of the plate in these two mutually perpendicular directions are functionally related and this fact has an important bearing on the design of expansion joint plates embodying the present invention and, as will be seen, is a controlling factor in arriving at the optimum design of such plates.

Each of the plates has a series of concentric corrugations 12 formed therein between the inner and outer peripheries of the plate. The concentric corrugations formed in the plates are of varying depth with the depth as measured from the neutral axis to the convex surface at the center of a given corrugation being proportional to the tangential radius of curvature (illustrated by the line Y—Y of Fig. 4) of the plate at such a point when the plate is deflected axially. Under such conditions, the corrugations at the central portion of the plate are the shallowest and the depth of the corrugations increases toward the edges of the plate. With corrugations formed in this manner, the tangential bending stress due to axial deflection of the plate is substantially the same in the outermost fibres of all the corrugations.

It follows from the uniformity of transverse bending stresses and the radial bending stresses at the edges that the ratio of the depth of the corrugations C at any given point to one-half the thickness $c$ of the plate is the same as the ratio of the transverse radius of curvature R of the plate at such a point to the radial radius of curvature $r$ of the plate at the outer edge thereof. In other words:

$$\frac{C}{c} = \frac{R}{r}$$

where C is the depth of the corrugation (to the neutral surface); $c$ is one-half the thickness of the plate; R is the transverse radius of curvature; and $r$ is the radial radius of curvature.

In Fig. 2, the curve 14—20 represents a half radial section of the neutral surface of one of the plates in a deflected position with the deflection relative to the width of the plate being greatly exaggerated so as to keep the size of the diagram within limits. The deflection of the plate used for laying out this diagram would ordinarily be the maximum to which the plate would be subjected to in usage. Points 15, 16, 17, 18 and 19 have been located at regularly spaced intervals along the curve 14—20 with the point 17 being at the center thereof. The deflection curve 14—20 is similar to that of a beam of uniform cross section with the ends fixed and one support moved relative to the other in a direction perpendicular to the axis of the beam. It is likewise the same as if this beam consisted of two cantilevers, with one extending from 14 to 17 and being fixed at 14 and loaded at 17 and with the other extending from 20 to 17 and being fixed at 20 and loaded at 17. These cantilevers may be referred to as "elementary cantilevers."

The elastic curve of such a beam is substantially the same as the deflection curve in a radial plane of the neutral surface of a corrugated plate embodying the present invention and since the equations of the elastic curve of such a beam are well known, it is possible from such equations, to calculate the angle of slope at any desired point on the beam for a given perpendicular deflection of one end of the beam relative to the other. The angles of slope so obtained are, thus, substantially the angles of slope of the radial section of the neutral surface of the plate.

Referring to Fig. 2, the line OZ represents the axis of the plate, that is, it is a line passing through the center of the circle of the inner and outer edges of the plate and perpendicular to the planes of these circles which are parallel to each other. A line 17b drawn normal to the deflection curve 14—20 at the point 17, intersects the axis OZ at the point $b$ and the length of the normal 17b from the point 17 to the point $b$ on the axis determines the length of the tangential or transverse radius of curvature of the neutral surface of the plate at the point 17. Likewise, every normal to the neutral surface of the plate at other points, such as the lines 16c and 18d at the points 16 and 18 respectively, intersects the axis OZ extended, and the lengths of the normals to their points of intersection with the axis are the lengths of the tangential radii of curvature at points 16 and 18 on the curve 14—20. The points of intersection of the normals at the points 14 and 20 of the curve 14—20 with the axis OZ will be at infinity. Obviously, the length of the tangential radii for various points on the curve 14—20 representing the neutral surface of the plate can be obtained graphically by laying out Fig. 2 to scale but since the angles of slope may be determined as explained above, the tangential radius of curvature at any point on the curve 14—20 may be immediately obtained by dividing the radial distance of the point from the axis OZ by the sine of the angle of slope at the point. Thus:

$$\frac{17e}{\sin a} = 17b$$

where the angle $a$ is the angle of slope.

The transverse or tangential bending of a corrugated plate embodying the present invention is similar to the bending of an ordinary rectangular piece of corrugated metal parallel to the corrugations except in the plate the curvature differs from point to point radially whereas in a rectangular piece of corrugated metal the curvature would be uniform at all points across the corrugations. In order to overcome the difficulty arising from this difference, the radial section of the plate may be considered as being composed of a large number of narrow beams of rectangular cross section, each beam having the same curvature as the tangential curvature of the plate at the radial point of location of that particular beam.

Figure 7:
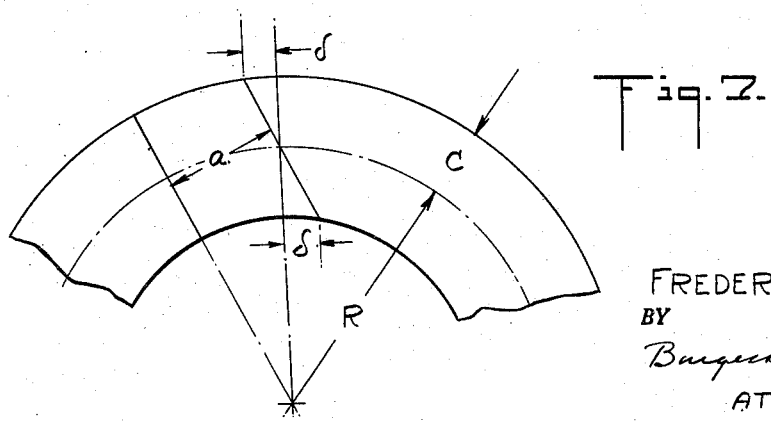
Fig. 7 is a diagrammatic representation of a portion of the plate shown in Fig. 6 on an enlarged scale and with the curvature being greatly exaggerated.

Referring to Fig. 7, the bending of the flat plate along the Y—Y axis is shown with the radius of curvature being greatly exaggerated for the purposes of illustration. This bending will correspond to the bending of a beam of rectangular cross-section. Thus, where "$a$" is the length of the beam before bending and $\delta$ is the amount the outer fibres are elongated and the inner fibres are shortened by bending to the radius R the formula $$\frac{S}{E} = \frac{C}{R}$$

may be developed where E is the modulus of elasticity, S is the maximum stress which occurs at the outer and inner fibres (being zero at the neutral plane) and C is the distance to the neutral axis of the beam (the line 14'—20' in Fig. 3). The distance to the neutral axis is commonly represented by "C" in these formulas and likewise is so used in this specification.

The tangential radius of curvature R is determined for a number of points on the plate, preferably uniformly spaced apart radially, by the method set forth above. The coefficient of elasticity E is well known for all ordinary metals which would be commonly used for expansion joint plates. The bending stress S in the outermost fibre is selected by the designer in view of the endurance desired, there being extensive literature on the fatigue of metal in relation to stress for use as a guide if necessary. If this stress is taken the same as the radial bending stress at the edge of the plate for any deflection, the endurance is substantially the same in transverse and radial directions.

Having thus calculated the values of "C" for the several radially spaced points at which the transverse radii of curvature have been obtained, the distances C for the various points are then laid out as shown in Fig. 3, wherein the line 14'—20' represents a radial section of the neutral surface of the plate when undeflected, being the neutral axis of the radial section. The lines $C_{15}$, $C_{16}$, $C_{17}$, $C_{18}$ and $C_{19}$ in Fig. 3 represent the plotted values of "C" which have been determined for the radially spaced points 15', 16', 17', 18' and 19'. By drawing a curved line $m$—$n$ through the plotted valves of "C" for these points, the value of "C" at any point on the neutral axis is the vertical distance from line 14'—20' to the curve $m$—$n$. At the points 14' and 20', the curve $m$—$n$ extends to infinity, which means that there is no tangential bending or curvature of the plate at these points. The curve $m$—$n$ is then reproduced in reverse below the line 14'—20' and is marked $m'$—$n'$. Obviously, any radial section of the plate would be the same as that shown in Fig. 3 and the transverse radii of curvature would be the same at corresponding points for every radial section.

The cross section of he corrugations are now laid out so that they extend entirely between the lines $m$—$n$ and $m'$—$n'$, with the convex surface of the peaks of the corrugations contacting tangentially $m$—$n$ and $m'$—$n'$ in the manner shown in Fig. 3. It is desirable to make as many corrugations as possible in the selected width of plate, but the number of corrugations depends upon practical considerations such as the draw and stretch of the metal in forming, which in turn depends considerably upon the depth of the corrugations, all of which are similar to the usual problems which arise in the forming of metal in dies and offer no special difficulty to those skilled in such metal forming. The flange portions at the inner and outer edges of the plate will be somewhat deeper than the deepest corrugations to provide clearance between adjacent plates upon compressive movement thereof. It is obvious that increasing the number of corrugations increases the transverse strength of the plate, provided there is no other change.

The advantage of obtaining the greatest possible transverse strength without increasing the transverse stress beyond the stress at the outer or inner edges of the plate results from the greater pressure that a plate of given width and thickness can as a result withstand. The internal pressure on the joint causes a uniformly distributed load on the plate which causes a deflection of the plate which on a radial section gives a deflection curve similar to the elastic curve of a beam fixed at both ends subjected to a uniformly distributed load and which in a tangential direction causes tangential curvature in the plate. It is this change of curvature and the resulting bending stresses that resists the pressure load upon the plate but since the plate is much stiffer in the tangential direction due to the corrugations, most of the pressure load is carried by the transverse bending. For a given maximum bending stress this resistance to transverse bending will increase with the number of corrugations and depth of corrugations.

In the method set forth above for calculating the depth of the corrugations, the effect of the internal pressure in the joint upon the deflection curve as shown in Fig. 2 has not been included. Since there must be some structure first before pressure effects could be calculated, the problem has been approached on the basis of providing the most efficient structure to withstand internal pressure on the joint for a given thickness of metal without decreasing the endurance of the joint in consequence of tangential bending stresses. Having arrived at such a structure there is, however, no known method of calculating the actual stresses due to the internal pressures and such must be determined by actually subjecting the joint to internal pressure and thus determining the pressure at which set occurs in the plates which indicates closely the stress in the plates from the properties of material of the plates. Change in pressure will result in a corresponding change in stress.

The transverse strength of the corrugations varies substantially as the square of the depth (assuming the corrugations the same except for depth). Thus if in a 6" joint the depth of the corrugations at the mean diameter of the plate (4³²⁄₃₂" rad. or 8⅜₁₆" dia.) is ⅛" then a similar plate twice the diameter would have a depth of ¼" for the same transverse stress due to the same deflection but for the same transverse strength to withstand internal pressure the depth of $\sqrt{2} \times \frac{1}{8}$" would be sufficient. The variation in depth of corrugations would follow the same law. Thus the limits to the depth are the minimum to stand the pressure and the maximum to limit the deflection stress.

In the commercial manufacture of such joints it is desirable for the joints to be like other pipe fittings in order to be capable of operating under a like range of pressure. Thus, a line of standard joints would preferably be capable of operating at any pressure up to 150 pounds per square inch maximum just as standard valves and other standard fittings. It consequently is more advantageous to design the plates without the stresses resulting from the pressure acting thereon. Under such conditions maximum movement is obtainable within the desired stress and then by reducing the movement of each plate in the joint and increasing the number of plates per unit of total movement the stress due to movement is correspondingly reduced to any desired value such that when the pressure stress is added thereto the total will not exceed that which will permit the required number of cycles of movement. This method allows for the increase due to pressure in bending stress in the radial plane as well as in the tangential plane.

In the manufacture of a line of joints for a given maximum pressure it is quite common and advantageous to maintain the width and the thickness of the annular portion of each plate the same for all sizes, with the diameter only of the plates being varied as shown, for example, in Fig. 8. In such a line of joints of the usual construction the internal pressure that the joints would stand decreased as the pipe size increased. However, with plates designed in accordance with the present invention, the depth of the respective corrugations increases with the diameter of the plate as is shown by the half sections of the three plates $10_a$, $10_b$ and $10_c$ illustrated in Fig. 8, and as a consequence, the larger joints will withstand as great a pressure as the smaller ones with the thickness and width of the annular portions thereof being substantially the same. As shown in Fig. 8, the corrugations of the respective plates which are laid out in the same manner as the corrugations of the plate shown in Fig. 3 are of varying depths and the depths of corresponding corrugations in different plates vary directly in proportion to the diameters of the plates.

It also follows from the method set forth that the depth of the corrugations are greatest next to the inner and outer edges of the plates, as shown in Fig. 3, irrespective of their diameter. This is extremely advantageous since a large portion of the bending of the plate in the radial plane to give the required deflection of the center of the plate relative to the edges occurs in the inclined portions of these deep corrugations so that the radial curvature of the edges of the plate are much less than in the case of a flat plate, of same width and thickness under the same deflection and there is a corresponding decrease in the bending stress at those points. While the curvature cannot readily be accurately measured at those points, the stress can be exactly determined by measuring the load required to actually cause the given deflection of the elementary cantilever of the corrugated plate. By this method, it has been found that even in the case of a small plate the load required to deflect a narrow cantilever section extending from the edge to the middle of the plate was less than three quarters of the load required to deflect a similar uncorrugated cantilever the same amount, the bending stresses being directly proportional to the loads under these conditions. In the case of larger plates where the corrugations are deeper the difference would be greater.

Although there is this considerable difference in load required to cause the same deflection, it has been found by actual measurements, as already stated, that there is very little, if any, difference in the deflection curves between a flat cantilever and a corresponding elementary cantilever of the present corrugated plate. This is due to the fact that the deflection curves are plotted from the vertical components of the movements of the cantilevers. In a flat cantilever there is practically no other movement, but in the present corrugated plate there are substantial horizontal components to the movements of various portions of the deep corrugations close to the edges of the plate which only affect the vertical components slightly, if at all, but which do, however, distribute the bending stress over a considerable portion of the elementary beams forming the corrugated cantilevers, at those portions of the cantilevers where the bending moments are most effective, which bending moments are more concentrated at and near the support in the case of a flat cantilever.

From the actual tests, it has been found that joints similar to Fig. 1 constructed with the form of plate, as shown in Fig. 3, have much greater endurance (number of cycles of movement) than joints constructed with the usual plates.

In commercial expansion joints, it has been found that four plates made in accordance with the present invention will do the work of sixteen plates of the type used previously. This reduces the cost of the expansion joints to such an extent and thus, opens up the field of usefulness for such expansion joints so greatly that it is revolutionary in the expansion joint art.

I claim:

1. An annular flexible plate for an expansion joint, said plate having inner and outer edges with a series of concentric corrugations formed in the surface thereof between said inner and outer edges, said corrugations being of different depths with the ratio of the depth of the respective corrugations at a given point to one-half the thickness of the plate being equal to the ratio of the tangential radius of curvature of the plate at said joint to the radial radius of curvature of the plate at the outer edge thereof upon axial deflection of one edge of the plate with respect to the other edge of the plate when the maximum bending stresses acting on the plate are less than the elastic limit of the material of the plate.

2. An annular flexible plate for an expansion joint, said plate containing a series of concentric corrugations in its surface, the depth C, of each of said corrugations being equal to $$\frac{RS}{E}$$

where S is a stress selected for the corrugation, R is the radius of transverse curvature of the plate at the center of said corrugation, when one edge of the plate is deflected axially with respect to the other edge thereof for a predetermined distance within the elastic limit of the plate; and E is the coefficient of elasticity of the material of the plate.

3. An annular flexible plate for an expansion joint as defined in claim 2 wherein the depth of the corrugation at the center of said plate is related to the depths of corresponding corrugations in a series of annular flexible plates of different diameters, each of which has an annular portion of substantially the same thickness and radial width as the first-mentioned plate, by the formula:

$$\frac{C}{D}=\frac{C_1}{D_1}=\frac{C_2}{D_2}= \ldots \frac{C_n}{D_n}$$

where $C, C_1, C_2, \ldots C_n$ are the depths of the corrugations at the centers of the respective plates and $D, D_1, D_2 \ldots D_n$ are the diameters of the corrugations at the centers of the respective plates.

4. An annular flexible plate for an expansion joint, said plate having a series of concentric corrugations formed therein, said corrugations being of different depths with the depth at the center of the respective corrugations being inversely proportional to the tangential curvature of the plate at the center of the respective corrugations resulting from an axial deflection of one edge of the annular plate with respect to the other edge thereof for a predetermined distance within the elastic limit of the material of the plate.

5. An annular flexible plate for an expansion joint, said plate having an annular surface with a continuous series of concentric corrugations of different depths formed in said surface, the depths of said corrugations being at least at the center of the annular surface of the plate and gradually increasing toward the inner and outer edges of said annular surface.

6. An annular flexible plate for an expansion joint as defined in claim 5 wherein the depth of the corrugation at the center of the annular surface of said plate is related to the depths of corresponding corrugations in annular surfaces of a series of annular flexible plates of different diameters, each of which have annular portions of substantially the same radial width and thickness as the first-mentioned plate, by the formula:

$$\frac{C}{D}=\frac{C_1}{D_1}=\frac{C_2}{D_2}= \ldots \frac{C_n}{D_n}$$

where $C, C_1, C_2, \ldots C_n$ are the depths of the corrugations at the centers of the respective plates and $D, D_1, D_2 \ldots D_n$ are the diameters of the corrugations at the centers of the respective plates.

7. An annular plate for an expansion joint, said plate comprising an annular portion having inner and outer edges with a continuous series of concentric corrugations formed in the entire surface thereof between said edges and connection flanges extending from the inner and outer edges thereof, said corrugations being of different depths with the depths of the corrugations being least at the center of the annular portion of the plate and increasing in depth toward the inner and outer edges thereof, said connection flanges facing in opposite axial directions and being spaced axially with respect to the annular portion of the plate with the faces thereof being located in substantially parallel planes beyond the deepest of the corrugations in the annular portion of the plate.

8. An annular flexible plate for an expansion joint, said plate having inner and outer edges defining an annular surface; a series of concentric corrugations formed in said annular surface, the depth C of the corrugation at the center of said annular surface being equal to $$\frac{RS}{E}$$

where S is the stress selected for said corrugation, R is the radius of transverse curvature of the plate at the center of said corrugation when one edge of the annular surface is deflected axially with respect to the other edge thereof for a predetermined distance within the elastic limit of the plate, and E is the coefficient of elasticity of the material of the plate; and the depth of said corrugation is related to the depths of corresponding corrugations in a series of annular flexible plates having annular surfaces of the same radial width and being of substantially the thickness as the first-mentioned plate, but having different diameters, by the formula:

$$\frac{C}{D} = \frac{C_1}{D_1} = \frac{C_2}{D_2} = \ldots \frac{C_n}{D_n}$$

where $C, C_1, C_2 \ldots C_n$ are the depths of the corresponding corrugations in the respective plates and $D, D_1, D_2 \ldots D_n$ are the diameters at the center of the corresponding corrugations in the respective plates.

References Cited in the file of this patent

UNITED STATES PATENTS 2,657,075  Schwester _____ Oct. 27, 1952

FOREIGN PATENTS 9,767  Switzerland _____ Feb. 7, 1895
576,839  Germany _____ Sept. 19, 1933

UNITED STATES PATENT OFFICE
CERTIFICATE OF CORRECTION

February 3, 1959

Patent No. 2,871,885　　　Frederick Ray

It is hereby certified that error appears in the printed specification of the above numbered patent requiring correction and that the said Letters Patent should read as corrected below.

Column 5, line 13, for "valves" read -- values --; line 24, for "he" read -- the --; column 7, line 49, for "joint" read -- point --; column 8, line 25, strike out "at", first occurrence; line 54, for "annuular" read -- annular --; column 10, line 3, list of references cited, under the heading "UNITED STATES PATENTS" for "Oct. 27, 1952" read -- Oct. 27, 1953 --; under the same heading add -- 1,927,617 Schmidt - - - Sept. 19, 1933 --; same column, line 8, under the heading "FOREIGN PATENTS" for "Sept. 19, 1933" read -- May 17, 1933 --.

Signed and sealed this 2nd day of June 1959.

(SEAL)
Attest:
KARL H. AXLINE
Attesting Officer

ROBERT C. WATSON
Commissioner of Patents